United States Patent

Takahashi et al.

[15] 3,694,751

[45] Sept. 26, 1972

[54] INDUCTION RADIO TRANSMISSION SYSTEM

[72] Inventors: Kensaku Takahashi, Tokyo; Kenichi Yoshida, Sakai, both of Japan

[73] Assignees: Japanese National Railways, Tokyo; Sumitomo Electric Industries Ltd., Osaka, Tokyo, Japan

[22] Filed: Sept. 22, 1969

[21] Appl. No.: 859,960

[30] Foreign Application Priority Data

Sept. 20, 1968 Japan ..................43/68413

[52] U.S. Cl. ........................325/51, 179/82, 325/52, 246/8, 246/30

[51] Int. Cl. ..........................H04b 7/00, H04b 15/00

[58] Field of Search ....179/82; 325/28, 51, 111, 305, 325/365–367, 52; 343/719, 180; 246/8, 30

[56] References Cited

UNITED STATES PATENTS

| | | | |
|---|---|---|---|
| 1,353,002 | 9/1920 | Weagant | 343/179 |
| 3,043,916 | 7/1962 | Sneath | 179/82 |
| 3,470,474 | 9/1969 | Rohrer | 325/28 |

*Primary Examiner*—Albert J. Mayer
*Attorney*—Carothers and Carothers

[57] ABSTRACT

An induction radio transmission system for vehicles wherein three spaced conductors are installed in parallel along the vehicle path with a generator feeding an in-phase signal electric current to the outer of said three conductors and the signal electric current in opposite phase to the remaining center conductor. Two antenna are mounted aboard the vehicle and are respectively and cooperatively coupled with the magnetic fields of opposite phase generated by the energized conductors and are serially connected to additively combine the signal received from each antenna and cancel unwanted noise. The system may be reversed such that the antennas are energized to induce signal current flow in the conductors.

1 Claim, 3 Drawing Figures

INVENTORS
KENSAKU TAKAHASHI
& KENICHI YOSHIDA
BY
CAROTHERS & CAROTHERS
THEIR ATTORNEYS

INDUCTION RADIO TRANSMISSION SYSTEM

BACKGROUND OF THE INVENTION

This invention relates to an induction radio transmission system.

An important problem with which railroads are confronted in recent times, is how to deal with the excessive passenger loads and the high travel speeds. A criterion to solve this problem is to transfer train operation from the hands of humans to control by electronic computers.

That is to say, an optimum operation of trains will be realized by installing an electronic computer of an adequate capacity at a central control station which will exercise an overall control over all trains by means of the computer.

The greatest problem encountered in this instance is the reliability of the transmission of control information. In information transmission systems for railroads, the levels of noise generated by the train are so high that it is necessary either to increase the signal transmission levels or to make a transmission system which includes a transmission line which possesses a noise suppressing effect, if a higher reliability of information transmission is to be ensured.

Generally speaking, a train automatic operation system of high quality must be provided in which signals are transmitted and received without physical component contact between an information transmission line, installed along the railroad track from a central information processing and control station containing an electronic computer, and an antenna installed aboard a train.

As one such information transmission system in use, there is the induction radio transmission system which comprises two parallel conductors. If a signal electric current is caused to flow in the conductors of the transmission line, induction magnetic fields are created around them. These magnetic fields induce a voltage in the antenna, and perform the transmission of information between the devices attached to the antenna and the transmission line. As one method for eliminating induction noise in such a transmission line consisting of two parallel conductors, there is a known method in which the parallel conductors are crossed at suitable intervals and thereby the noise generated in adjacent sections between crossings is offset. If the crossing method is employed, however, the coupling between the antenna and the transmission line is cut off at the crossing points, which causes great difficulty in obtaining high quality information transmission as required of an automatic train operation system. Furthermore, in order to make this method effective, it is necessary to provide a crossing within a range where the phase and intensity distribution of noise are considered uniform. As the frequency range of noise from an electric car is narrow, the intervals between crossings have to be short. This makes the difficulty even greater.

This invention provides a new induction radio transmission system which is free from the afore-mentioned drawbacks, suppresses noise existing even in a narrow region, and has no interruption of coupling.

Other objects and advantages appear in the following description and claims.

The accompanying drawings show, for the purpose of exemplification without limiting the invention or the claims thereto, certain practical embodiments illustrating the principles of this invention wherein:

Figure 1:
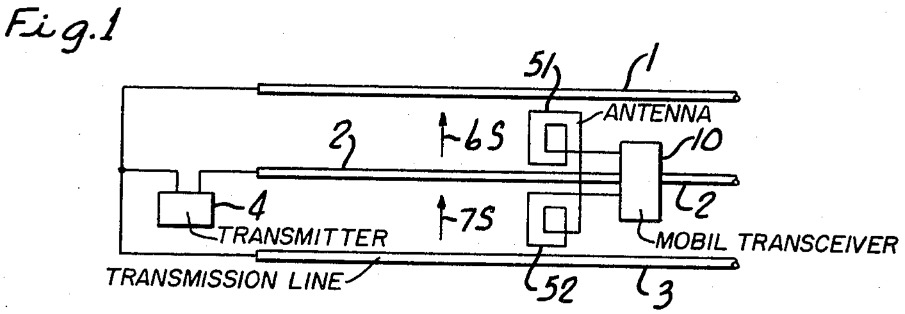
FIG. 1 is a diagrammatic view illustrating the principles of the transmission system of the present invention.
Figure 2:
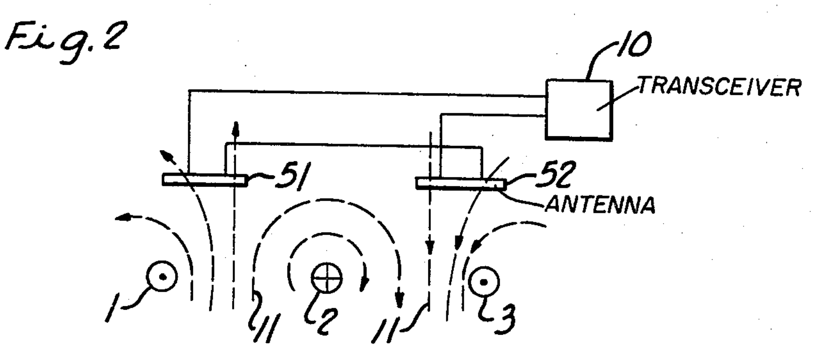
FIGS. 2 and 3 are diagrammatic cross sectional views explanatory of the coupling between the conductor and the antenna in the induction radio transmission system of this invention.
Figure 3:
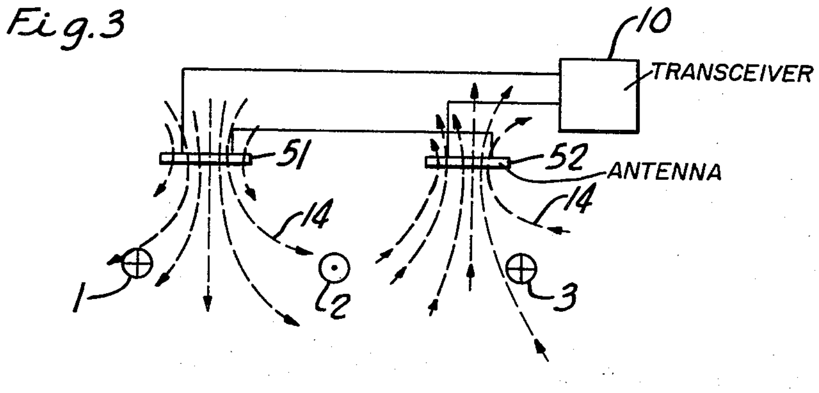

FIG. 1 shows the basic structure of the present invention. In FIG. 1, 1, 2 and 3 denote conductors for the flow of signal electric currents. The three conductors are installed in parallel along the track of a moving object, the conductors being equally spaced apart from one another.

Reference numeral 4 denotes the transmitter for sending signals to said conductors or the receiver which receives signals from said conductors. Coil antennas 51 and 52 are installed aboard a moving object or vehicle and positioned between the three conductors, antenna 51 coupling with the magnetic field generated by the electric currents flowing in the conductors 1 and 2 to induce a voltage and antenna 52 coupling with the conductors 2 and 3 to induce a voltage.

The two antennas are so wired that the voltages generated in the antennas 51 and 52 are added together. Vectors 6S and 7S denote induced voltages due to noise, which will be explained later.

When transmitter 4 is transmitting, in-phase signal currents are sent to conductors 1 and 3, while a signal current of the opposite phase is sent to the other conductor 2. In consequence, voltages are induced in the antennas 51 and 52 by the signal currents flowing in the conductors, and received by the receiver-transmitter 10.

On the other hand, when 10 acts as a transmitter, signal currents flow in the antennas 51 and 52 and induce in-phase voltages in the conductors 1 and 3 a voltage of the opposite phase in the conductor 2, these voltages being received by the receiver 4.

FIG. 2 is a cross sectional view of the embodiment of this invention shown in FIG. 1, showing an instance wherein 4 acts as the transmitter and 10 as the receiver. 51 and 52 are antennas to be installed on board the train or vehicle. The figure also shows their relative positions with respect to the transmission wires 1, 2 and 3 and the connection between the antennas. 10 is the receiver or transmitter aboard the train.

The magnetic fields created by the transmission wires as energized by the transmitter 4 are shown by groups 11 of broken lines containing arrows in FIG. 2. Obviously, they are in inverse symmetry left and right with respect to the conductor 2; for instance, if a magnetic field directed upward is created at the left, a magnetic field directed downward is created at the right. As the antennas 51 and 52 couple with the magnetic fields of opposite directions respectively, the voltages induced therein are in opposite phases. Since connection is made so as to have these voltages in opposite phases added together, it is possible to receive the information flowing in the transmission line.

An instance wherein the antennas receive signals has been explained above. The same principle applies to an instance where signals are sent to the transmission line from the antennas. FIG. 3 shows an instance wherein signals are sent to the transmission line from the antennas. That is to say, reference numeral 4 in FIG. 1 is considered to be the receiver and 10 in FIG. 3 to be the transmitter. In this case, if signal currents are caused to flow in the antennas 51 and 52 from the transmitter 10, the antennas create the magnetic fields 14 shown in broken lines and induce voltages in the transmission wires 1, 2 and 3, the electric currents thus produced being received by the receiver 4.

Induction noise from outside is suppressed by such a system structure. Generally, the noise from an electric car or the like may be considered to be uniform for a distance about the same as the width of the transmission line, i.e., the distance between the conductors 1 and 3, or the distance between the antennas 51 and 52. In consequence, in so far as the transmission line is concerned, it generates in-phase voltages between the conductors 1 and 2 and between the conductors 2 and 3.

That is to say, voltages shown by vectors 6S and 7S in FIG. 1 are generated. As already mentioned, however, the receiver at the end of the transmission line is so connected that only the induction signals of the opposite phase are received, so that the afore-mentioned noise is cancelled at the input point of the receiver. In a like manner, the antennas 51 and 52 are so connected that induction voltages of opposite phases due to outside noise are added together, so that the in-phase noise voltages are cancelled or set off against each other at the input point of the receiver.

As mentioned above, not only is noise in a wide frequency range suppressed, but also noise in a narrow frequency range, like that of an electric car suppressed by the system structure according to this invention. Furthermore, there is no interruption of coupling between the antennas and transmission line, as is the case with conventional systems, the S/N ratio of the system is improved, and the dependability of information transmission is enhanced.

In the foregoing description, we have explained an instance where the antenna system is so positioned that it couples with the component of the magnetic fields produced by the transmission line which is normal to the plane containing the conductors. Generally speaking, however, it is sufficient if the antenna system comprises two antennas so positioned that their respective induced voltages are in opposite phase to each other. For example, it is permissible to position them so as to couple them with the magnetic fields in parallel with (rather than normal to) said plane.

The structure of this invention is applicable to induction radio transmission systems in which electric currents are caused to flow in conductors for the purpose of transmitting information by utilizing the magnetic fields thereby created. It can, therefore, be applied also to an induction radio transmission line applications of such a type that a coaxial line is used to prevent electric fields from being produced in the exterior and to have only magnetic fields contributing to the coupling being produced in the exterior.

We claim:

1. An induction radio transmission system for moving vehicles comprising three evenly spaced conductors installed in parallel along a vehicle path of movement, generator means to simultaneously energize the outer two conductors of said three with an in-phase signal electric current while energizing the remaining center conductor with said signal electric current in opposite phase such that matched magnetic fields of opposite phase are created between each outer conductor and said center conductor respectively, two spaced antennas mounted in a common plane transverse to said conductors on a vehicle following said path and uniformly positioned in relation to each other and said conductors such that they are inductively coupled with said matched magnetic fields of opposite phase respectively, said antennas being serially connected such that any signal electric current flowing therein is additively combined.

* * * * *